United States Patent
Kotecha et al.

(10) Patent No.: US 9,549,335 B2
(45) Date of Patent: Jan. 17, 2017

(54) TRAFFIC AGGREGATION AT END DEVICE

(71) Applicant: Verizon Patent and Licensing Inc., Basking Ridge, NJ (US)

(72) Inventors: Lalit R. Kotecha, San Ramon, CA (US); Matthew W. Nelson, Pleasanton, CA (US); Sagiv Draznin, Walnut Creek, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 331 days.

(21) Appl. No.: 14/257,555

(22) Filed: Apr. 21, 2014

(65) Prior Publication Data
US 2015/0304880 A1 Oct. 22, 2015

(51) Int. Cl.
| | | |
|---|---|---|
| *H04W 28/02* | (2009.01) | |
| *H04L 12/841* | (2013.01) | |
| *H04W 4/18* | (2009.01) | |
| *H04W 76/04* | (2009.01) | |
| *H04L 12/805* | (2013.01) | |
| *H04W 88/02* | (2009.01) | |
| *H04W 52/02* | (2009.01) | |

(52) U.S. Cl.
CPC .......... *H04W 28/0215* (2013.01); *H04L 47/28* (2013.01); *H04L 47/365* (2013.01); *H04W 4/18* (2013.01); *H04W 76/048* (2013.01); *H04W 52/02* (2013.01); *H04W 88/02* (2013.01)

(58) Field of Classification Search
CPC .... H04W 28/0215; H04W 72/02; H04W 4/18; H04W 36/0072; H04W 88/02
See application file for complete search history.

(56) References Cited

U.S. PATENT DOCUMENTS

| | | | |
|---|---|---|---|
| 2007/0104158 A1* | 5/2007 | Liang ................. | H04W 76/066 370/338 |
| 2013/0039179 A1* | 2/2013 | Chapman ............... | H04L 47/22 370/230.1 |
| 2014/0064134 A1* | 3/2014 | Huang ................ | H04W 76/068 370/253 |
| 2015/0023160 A1* | 1/2015 | Alisawi ................. | H04L 47/32 370/230 |

\* cited by examiner

*Primary Examiner* — Muthuswamy Manoharan

(57) ABSTRACT

A method, a device, and a non-transitory storage medium to store traffic aggregation settings that include hold time values that each indicate a maximum period of time to suspend a transmission of data; receive data from a resident application; determine a type of application from which the data is received; determine whether the device in an active state; select one of the hold time values in response to a determination that the device is not in the active state; suspend a transmission of the data in response to a selection of the one of the hold time values, wherein the transmission of the data is suspended for at least a portion of a maximum time period indicated by the one of the hold time values; and transmit the data subsequent to the at least the portion of the maximum time period elapsing.

21 Claims, 11 Drawing Sheets

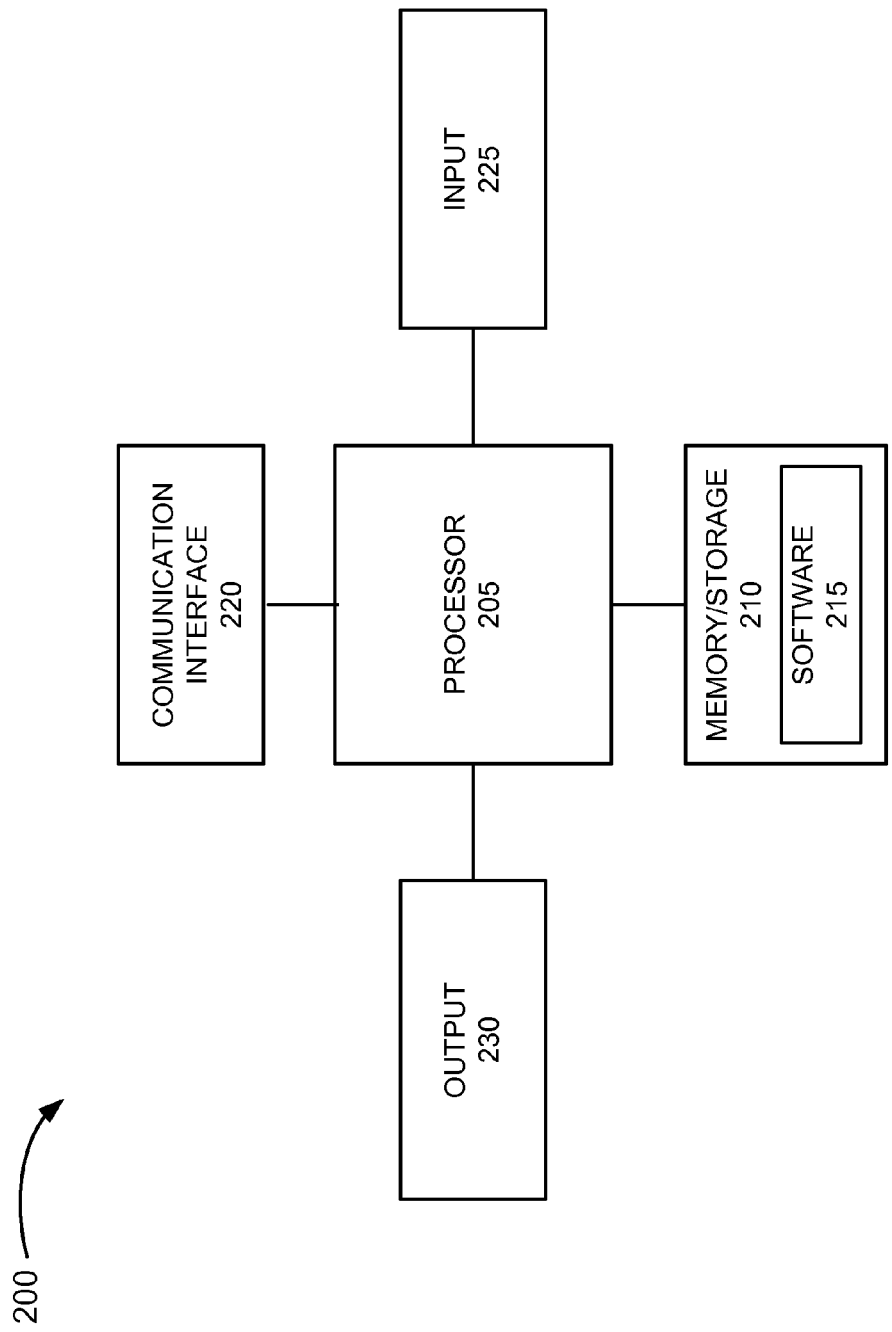

TRAFFIC AGGREGATION AT END DEVICE

BACKGROUND

There are two general types of wireless data traffic, namely, signaling traffic and bearer traffic. When an end device establishes, maintains, and releases a connection with a network, the network must use resources to accommodate the traffic stemming from the connection. Additionally, from the end device perspective, the end device must use resources to support these facets of the connection with the network.

BRIEF DESCRIPTION OF THE DRAWINGS

FIG. 2 is a diagram illustrating exemplary components of the end device;

DETAILED DESCRIPTION OF PREFERRED EMBODIMENTS

Figure 1A:
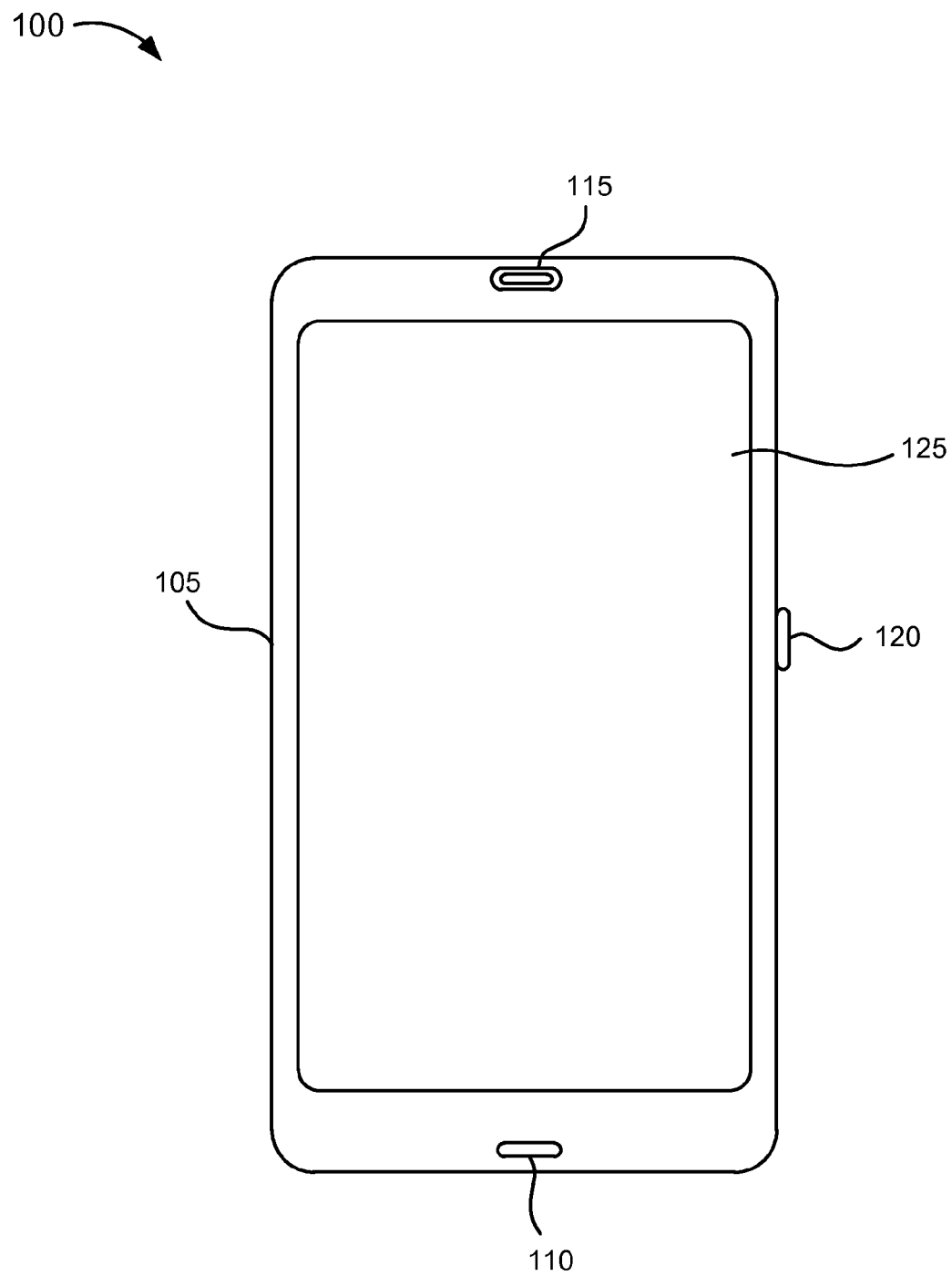
FIG. 1A is a diagram of an exemplary end device in which exemplary embodiments described herein may be implemented.

The following detailed description refers to the accompanying drawings. The same reference numbers in different drawings may identify the same or similar elements. Also, the following detailed description does not limit the invention.

The term "traffic," as used herein, refers to signaling traffic, bearer traffic, or both. Signaling traffic includes signaling data and bearer traffic includes bearer data. The term "state," as used herein, refers to an operative condition of a device. For example, the state of the device may refer to the operative condition of one or multiple components of the device, such as the operative condition of a main processor, a communication interface, an application, etc. In this description, the terms "dormant" and "active" are used as descriptors of particular states. The term "dormant" may correspond to similar terms such as "idle," "sleep," "hibernate," "standby," "inactive," etc.

Various applications resident on an end device may generate traffic having various traffic characteristics. For example, an application may generate small amounts of data to transmit via short-lived connections. These traffic instances may be periodic or aperiodic. As a result, resources at the end device and in a network via which the end device communicates can be negatively impacted. For example, multiple applications residing on a mobile device may each generate and transmit traffic, which causes a processor, a transceiver, a battery, etc., of the mobile device to be used to support each transmission of the traffic. Additionally, the mobile device may transition from a dormant state to an active state to transmit the traffic. Furthermore, the network allocates and uses resources to support each transmission.

According to an exemplary embodiment, an end device includes a traffic aggregator. The traffic aggregator aggregates traffic stemming from an application residing on the end device. For example, the traffic aggregator aggregates, during a time period, traffic stemming from an e-mail application and a Web browser. Thus, for example, in contrast to the end device allowing the e-mail application and the Web browser to each transmit separate packets on their own and according to their own timeline, the traffic aggregator collects and aggregates the packets and transmits the packets together.

According to an exemplary embodiment, applications residing on the end device are grouped according to service level agreements (SLAs). For example, real-time applications may be grouped together, and non-real-time applications may be grouped together. According to an exemplary embodiment, the traffic aggregator applies a hold time to traffic based on the group to which the traffic belongs. For example, for real-time applications, the traffic aggregator may not apply any hold time to traffic. In contrast, depending on a tolerance for delay for other groups of applications, the traffic aggregator may apply a hold time for such traffic. That is, the traffic aggregator may wait a configurable time period before transmitting traffic to the network. In this way, the traffic aggregator may collect traffic from multiple applications.

According to an exemplary embodiment, the traffic aggregator determines a state of the end device. For example, the traffic aggregator determines whether the end device is in an active state or a dormant state. According to an exemplary embodiment, the traffic aggregator applies a hold time to traffic based on the state of the end device.

According to an exemplary embodiment, the end device is a mobile device. For example, the mobile device may be implemented as a computer, a smartphone, a personal digital assistant (PDA), a tablet device, a palmtop device, a netbook, a gaming device, a location-aware device, and/or a music playing device. According to another exemplary embodiment, the end device is a non-mobile device. For example, the non-mobile device may be implemented as various devices used for machine-to-machine communications.

According to an exemplary embodiment, the traffic aggregator includes a middleware component. For example, according to an exemplary implementation, the traffic aggregator operates between an application layer and an Internet Protocol (IP) layer.

According to an exemplary embodiment, a network device determines hold times for traffic based on network policies. According to an exemplary embodiment, applications undergo a certification process. During the certification process, applications are categorized according to the functions provided by the applications. For example, an application may be certified as a real-time application or a machine-to-machine application. Based on a network policy, the application is assigned a corresponding hold time. According to an exemplary implementation, each application is assigned a group identifier indicative of a function and corresponding hold time. According to an exemplary embodiment, the network device provides the hold times to the end device. The traffic aggregator uses the hold times to perform traffic aggregation, as described herein.

FIG. 1A is a diagram of an exemplary end device 100 in which an exemplary embodiment described herein may be implemented. End device 100 may be implemented as a mobile device, as previously described.

As illustrated in FIG. 1A, end device 100 comprises a housing 105, a microphone 110, a speaker 115, a button 120, and a display 125. According to other embodiments, end device 100 may comprise fewer components, additional components, different components, and/or a different arrangement of components than those illustrated in FIG. 1A and described herein. Additionally, end device 100 may take the form of a different configuration (e.g., a slider, a clamshell, a swivel, etc.) than the configuration illustrated in FIG. 1A.

Housing 105 comprises a structure to contain components of end device 100. For example, housing 105 may be formed from plastic, metal, or some other type of material. Housing 105 supports microphone 110, speaker 115, button 120, and display 125.

Microphone 110 is capable of transducing a sound wave to a corresponding electrical signal. For example, a user may speak into microphone 110 during a telephone call or to execute a voice command. Speaker 115 is capable of transducing an electrical signal to a corresponding sound wave. For example, a user may listen to music or listen to a calling party through speaker 115. Button 120 provides an input to end device 100. For example, button 120 may be used to perform one or multiple functions (e.g., turn on/turn off end device 100, etc.).

Figure 1B:
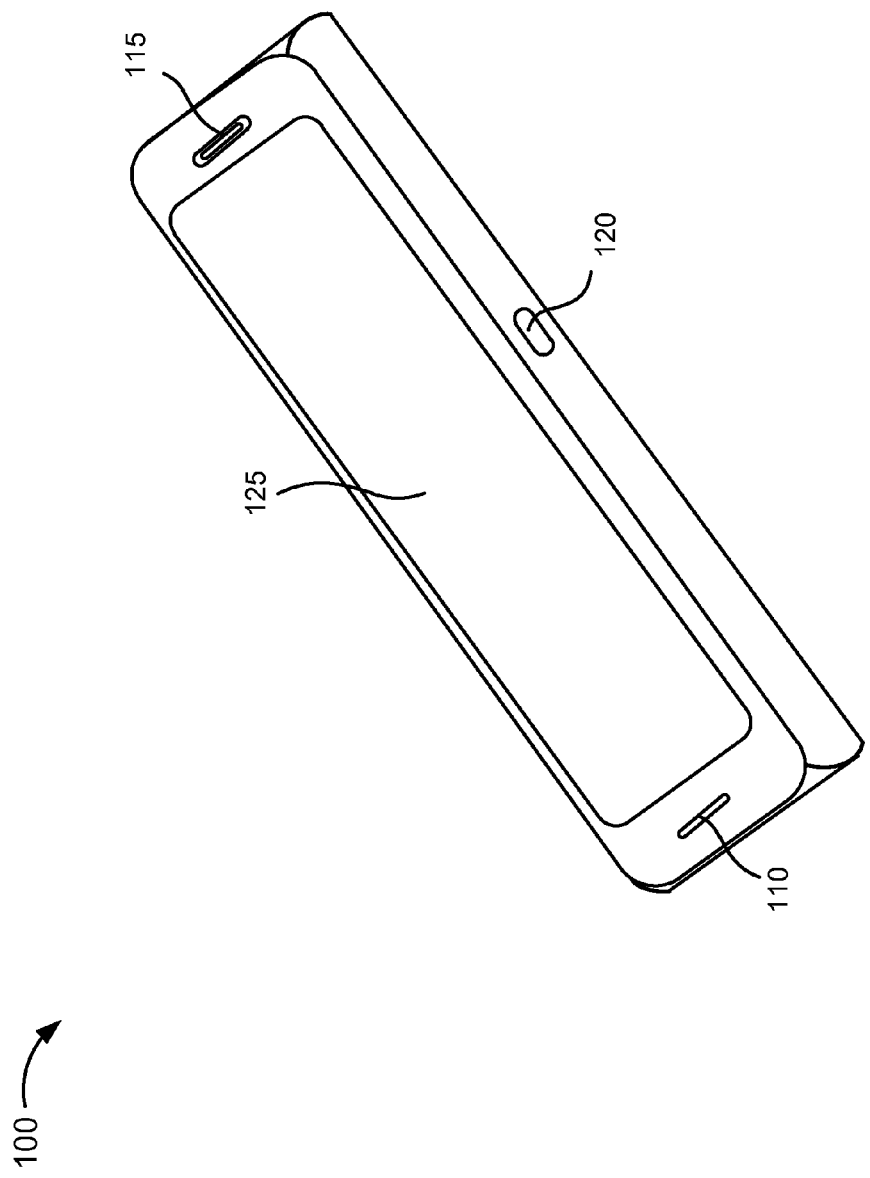
FIG. 1B is a diagram illustrating another view of the end device depicted in FIG. 1A.

Display 125 operates as an output component. For example, display 125 may comprise a liquid crystal display (LCD), a plasma display panel (PDP), a field emission display (FED), a thin film transistor (TFT) display, or some other type of display technology (e.g., OLED, active matrix OLED (AMOLED), etc). Display 125 is capable of displaying text, pictures, video, various images (e.g., icons, objects, etc.) that may be selected by a user to access various applications, enter data, and/or navigate, etc. Additionally, display 125 operates as an input component. For example, display 125 may comprise a touch-sensitive screen. Additionally, or alternatively, display 125 may comprise a touchless screen (e.g., having air-touch, air-gesture capabilities). FIG. 1B is diagram illustrating another view of end device 100.

FIG. 2 is a diagram illustrating exemplary components of end device 100. As illustrated, according to an exemplary embodiment, end device 100 includes a processor 205, memory/storage 210 that stores software 215, a communication interface 220, an input 225, and an output 230. According to other embodiments, end device 100 may include fewer components, additional components, different components, and/or a different arrangement of components than those illustrated in FIG. 2 and described herein.

Processor 205 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (e.g., one or multiple cores), microcontrollers, and/or some other type of component that interprets and/or executes instructions and/or data. Processor 205 may be implemented as hardware (e.g., a microprocessor, etc.), a combination of hardware and software (e.g., a SoC, an ASIC, etc.), may include one or multiple memories (e.g., cache, etc.), etc.

Processor 205 may control the overall operation or a portion of operation(s) performed by end device 100. Processor 205 may perform one or multiple operations based on an operating system and/or various applications or programs (e.g., software 215). Processor 205 may access instructions from memory/storage 210, from other components of end device 100, and/or from a source external to end device 100 (e.g., a network, another device, etc.).

Memory/storage 210 includes one or multiple memories and/or one or multiple other types of storage mediums. For example, memory/storage 210 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a phase-change memory (PCM), a dual in-line memory module (DIMM), a flash memory, and/or some other type of memory. Memory/storage 210 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 210 may include drives for reading from and writing to the storage medium.

Memory/storage 210 may be external to and/or removable from device 200, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray® disk (BD), etc.). Memory/storage 210 may store data, software, an operating system, and/or instructions related to the operation of end device 100.

Software 215 includes an application or a computer program that provides a function and/or a process. For example, software 215 may include a web browser, a telephone application, an Instant Messaging (IM) application, an e-mail application, a texting application, a navigation application, a social networking application, and/or other types of mobile applications (e.g., a gaming application, etc.). Software 215 may include firmware. Software 215 includes an operating system (OS). For example, depending on the implementation of end device 100, the operating system may correspond to iOS, Android, Tizen, BlackBerry, Windows Phone, or another type of operating system. According to an exemplary embodiment, software 215 includes the traffic aggregator, as described herein.

Communication interface 220 permits end device 100 to communicate with other devices, networks, systems, etc. Communication interface 220 may include one or multiple wireless interfaces and/or wired interfaces. Communication interface 220 may include one or multiple transmitters and receivers or transceivers. Communication interface 220 may operate according to a protocol and a communication standard.

Input 225 permits an input into end device 100. For example, input 225 may include a keyboard, a mouse, a display, a touchscreen, a touchless screen, a button, a switch, an input port, speech recognition logic, and/or some other type of visual, auditory, tactile, etc., input component. Input 225 may include a compass, a gyroscope, an accelerometer, and/or a motion sensor. Output 230 permits an output from end device 100. For example, output 230 may include a speaker, a display, a touchscreen, a touchless screen, a light, an output port, and/or some other type of visual, auditory, tactile, etc., output component.

End device 100 may perform a process and/or a function, as described herein, in response to processor 205 executing software 215 stored by memory/storage 210. By way of example, instructions may be read into memory/storage 210 from another memory/storage 210 (not shown) or read from another device (not shown) via communication interface 220 into memory/storage 210. The instructions stored by memory/storage 210 may cause processor 205 to perform a process described herein. Alternatively, for example, according to other implementations, end device 100 may perform a process described herein based on the execution of hardware (processor 205, etc.).

According to an exemplary embodiment, software 215 of end device 100 includes the traffic aggregator, as described herein. For example, the traffic aggregator is implemented as a middleware component. A further description of an exemplary embodiment of the traffic aggregator is described below.

Figure 3A:
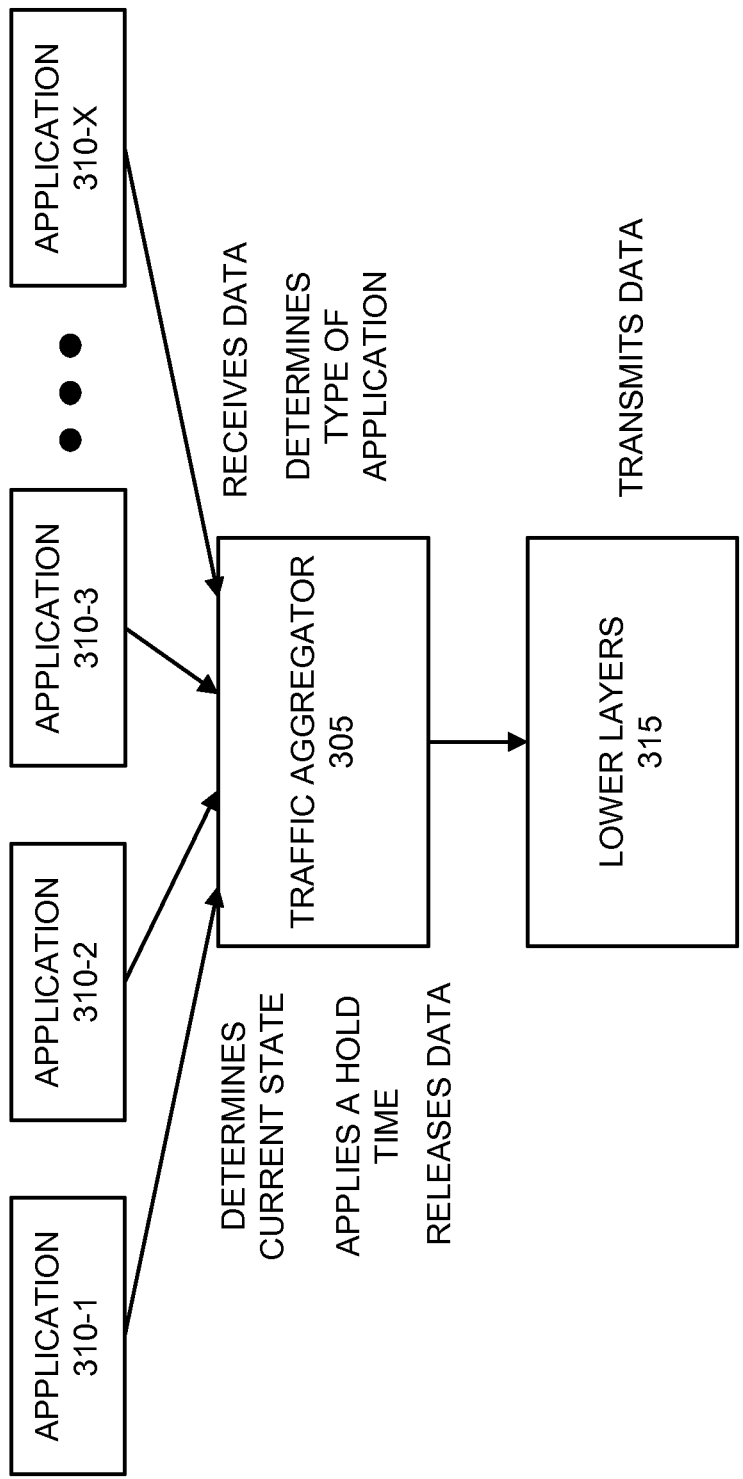
FIG. 3A is a diagram illustrating an exemplary traffic aggregator of the end device.

FIG. 3A is a diagram illustrating an exemplary traffic aggregator 305. As illustrated, traffic aggregator 305 communicates with multiple applications, such as applications 310-1 through 310-X (also referred to collectively as applications 310 or, generally or individually as application 310). For example, applications 310 may reside and operate on end device 100 in an application layer as software 215. Additionally, as illustrated, traffic aggregator 305 communicates with lower layers 315. For example, under the Open Systems Interconnection (OSI) model, lower layers 315 may correspond to the network layer, the data link layer, and the physical layer. Alternatively, for example, lower layers 315 may correspond to the transport layer, the network layer, the data link layer, and the physical layer. According to other implementations, depending on the model (Transport Control Protocol (TCP)/IP model, a closed (proprietary) model, etc.) or platform used by end device 100, traffic aggregator 305 may operate and/or communicate to different layers or functions pertaining to a network architecture.

According to an exemplary embodiment, traffic aggregator 305 performs traffic aggregation. According to an exemplary embodiment, traffic aggregation minimizes resource utilization at end device 100. For example, traffic aggregation may reduce the number of state transitions at end device 100. According to an exemplary embodiment, traffic aggregation minimizes resources used in a network to support transmissions from end device 100. An exemplary process pertaining to traffic aggregation is described further below.

According to an exemplary process, traffic aggregator 305 receives data from one or multiple applications 310 during any given instant in time. According to an exemplary implementation, the data may be encapsulated. According to another exemplary implementation, the data may not be encapsulated. According to an exemplary embodiment, traffic aggregator 305 inspects the data that is received. For example, traffic aggregator 305 identifies a type of application (e.g., a group to which the application belongs) from which the data is received. As an example, each application 310 may be grouped or categorized as a real-time application, a messaging application, a machine-to-machine application, a file transfer application, or an Internet application (e.g., a web browsing application, etc.). However, other types of groups or categories may be implemented. According to an exemplary implementation, each application 310 may be grouped or categorized based on the behavior of application 310. For example, the behavior may pertain to the communicative characteristics between application 310 and a network, such as size of packets, time criterion of transmission of packets (e.g., periodic, aperiodic, etc.), criticality of transmission of packets, etc. Additionally, or alternatively, according to an exemplary implementation, each application 310 may be grouped or categorized based on service level agreement requirements. According to an exemplary embodiment, traffic aggregator 305 identifies the type of traffic based on an inspection of the data. For example, as described further below, each application 310 may cause multiple types of traffic. Thus, depending on the type of traffic, traffic aggregator 305 may manage a particular type of traffic differently than another type.

According to an exemplary embodiment, traffic aggregator 305 determines a state of communication interface 220. For example, traffic aggregator 305 recognizes if communication interface 220 is in an active state or a dormant state. According to an exemplary embodiment, end device 100 is configured with a timer that triggers communication interface 220 to enter a dormant state after a certain time period of inactivity transpires. For example, the timer may cause communication interface 220 to enter a dormant state after a final packet is transmitted and a predetermined time period (e.g., seven seconds after the final packet is transmitted, 10 seconds after the final packet is transmitted, etc.). By way of further example, assume end device 100 is connected to a Long Term Evolution (LTE) network. When communication interface 220 enters the dormant state, communication interface 220 may, for example, no longer monitor control channels and/or perform other communicative-related functions, which would otherwise be performed when communication interface 220 is in the active state. According to other embodiments, traffic aggregator 305 determines the state of end device 100, which may include the state of components other than, or in addition to communication interface 220, such as processor 205, etc. End device 100 may store other timers that cause end device 100 to enter various states (e.g., a dormant state, etc.).

According to an exemplary embodiment, traffic aggregator 305 performs traffic aggregation based on the type of application 310 from which the data is received, the state of end device 100, and a hold time. The hold time indicates a period of time, which may have a value of zero and above, to hold (i.e., suspend) traffic before lower layers 315 operate on the traffic to provide for the transmission of the traffic. According to other embodiments, traffic aggregator 305 performs traffic aggregation based on other combinations of parameters, as described herein. For the sake of description, an exemplary table is described below that illustrates exemplary parameters on which traffic aggregator 305 may use to perform traffic aggregation.

Figure 3B:
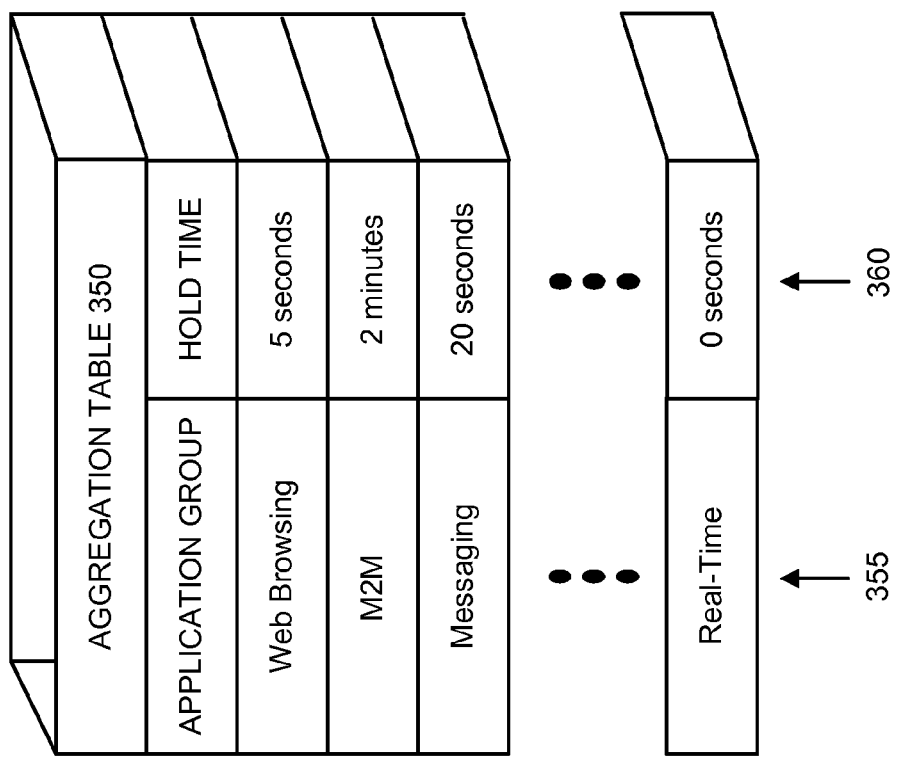
FIG. 3B is a diagram illustrating an exemplary aggregation table.

FIG. 3B is a diagram illustrating an exemplary aggregation table 350. As illustrated, aggregation table 355 includes an application group field 355 and a hold time field 360. Application group field 355 indicates a group or category of application 310, such as real-time, non-real-time, messaging, etc., as previously described. Hold time field 360 indicates a maximum hold time to suspend traffic before allowing lower layers 315 to operate on the traffic for transmission. According to an exemplary embodiment, the hold time values are configurable (e.g., by the user, an administrator, etc.). As an example, real-time applications 310 may be configured to have a hold time value=0 seconds. While other applications 310 may be configured to have hold time values such as, for example, 10 seconds, 2 minutes, 5 minutes, 45 seconds, etc. According to an exemplary embodiment, the hold time values are static or persistent. According to another exemplary embodiment, the hold time values are dynamic. For example, when end device 100 is a mobile device, the hold time values may be dependent on the degree of mobility of the user. For example, end device 100 may identify parameters of motion, such as speed, velocity, direction, acceleration, etc., using well-known components (e.g., an accelerometer, a compass, a motion sensor, etc.). End device 100 may also identify other parameters, such as signal strength, etc., relative to a network. By way of further example, according to an exemplary scenario, assume that a user of end device 100 is in a car. Due to high mobility, end device 100 may need to perform a handover, which in turn, results in traffic. In this regard, for example, hold time values may be increased to minimize interference with traffic that supports the handover.

According to other implementations, aggregation table 350 may include additional fields and/or different fields. For example, application 310 may transmit various types of traffic (e.g., heartbeat or ping traffic, query traffic, ad traffic, polling traffic, state notification traffic, streaming traffic, uploading traffic, peer-to-peer traffic, Hypertext Transfer Protocol (HTTP) traffic, Voice-over-IP (VoIP) traffic, etc.). Aggregation table 350 may include fields indicating a particular type of traffic associated with application group field 355. Thus, particular types of traffic of a particular application group may be assigned different hold time values. According to an exemplary embodiment, traffic aggregator 305 provides a user interface that allows a user or an administrator to configure traffic aggregator 305, such as hold times, groupings, and other parameters described herein.

According to an exemplary embodiment, traffic aggregator 305 provides services in support of the construction and maintenance of aggregation table 350. As previously described, applications 310 may be grouped or categorized based on their respective behavior. According to an exemplary embodiment, traffic aggregator 350 identifies the behavior of application 310 based on historical data. For example, traffic aggregator 305 may collect, store, and analyze historical data stemming from a usage of application 310 at end device 100. Traffic aggregator 305 may determine behavioral characteristics based on the analysis of the historical data. For example, traffic aggregator 305 may determine a frequency by which heartbeat or hello messages are intended to be transmitted by application 310. In this way, traffic aggregator 305 may calculate suitable hold time values for hold time field 360.

According to another exemplary embodiment, traffic aggregator 305 may predict the occurrence of traffic from application 310 when traffic occurs aperiodically. For example, it is not uncommon for free applications 310 to cause advertisements (ads) to be presented to a user based on ad providers integrated with or operating in conjunction with the free applications 310, which provide ad-serving processes. For example, a free application 310 may aperiodically initiate traffic to an ad server to obtain ads during the course of usage of the free application 310. Traffic aggregator 305 may predict when such ad traffic is likely to occur based on a statistical analysis of the historical data. Traffic aggregator 305 may use, for example, a Multivariate State Estimation Technique (MSET), a Markov chain-based model, a Bayesian network model, mean time between failures (MTBF), machine learning, etc., to prognosticate ad traffic. Traffic aggregator 305 may adjust the timer, as described above, based on the prediction. For example, traffic aggregator 305 may prevent end device 100 (e.g., communication interface 220) from entering a dormant state when ad traffic is predicted within a certain time window and a probability value pertaining to the prediction meets a certain threshold value. Additionally, other forms of data, such as user data, may be uploaded when the free application 310 is used. The user data may indicate the user's age, geographical location of end device 100, identifier of the user (e.g., an International Mobile Subscriber Identity (IMSI), etc.), and/or other information (e.g., contact entries, etc.). These types of applications 310 are sometimes referred to as "leaky apps." Further, traffic aggregator 305 may predict, with a high certainty, periodic traffic (e.g., heartbeat traffic, etc.). In this regard, traffic aggregator 305 may prevent end device 100 from entering a dormant state by adjusting the timer.

Referring back to FIG. 3A, assume that traffic aggregator 305 determines the type of application from which the data is received, the type of traffic pertaining to the data, and the state of communication interface 220 (e.g., which is determined to be dormant). Traffic aggregator 305 uses aggregation table 350 to determine an appropriate hold time. According to this example, assume hold time field 360 indicates a hold time of 30 seconds. In response, traffic aggregator 305 suspends the transmission of the data. For example, the data is stored in memory/storage 215 (e.g., a buffer).

During the suspension of the transmission of this data, traffic aggregator 305 continuously monitors the state of end device 100. In the event that additional data is subsequently received, in which the hold time value is zero and/or other data previously suspended needs to be transmitted, traffic aggregator 305 may not apply the entire hold time to the recently received data. Otherwise, traffic aggregator 305 may suspend the data for the entire hold time period. Thereafter, as illustrated in FIG. 3A, traffic aggregator 305 releases the data, which allows lower layers 315 to operate on the data. For example, lower layers 315 may encapsulate the data. Subsequently, lower layers 315 cause the data to be transmitted from end device 100.

Figure 4A:
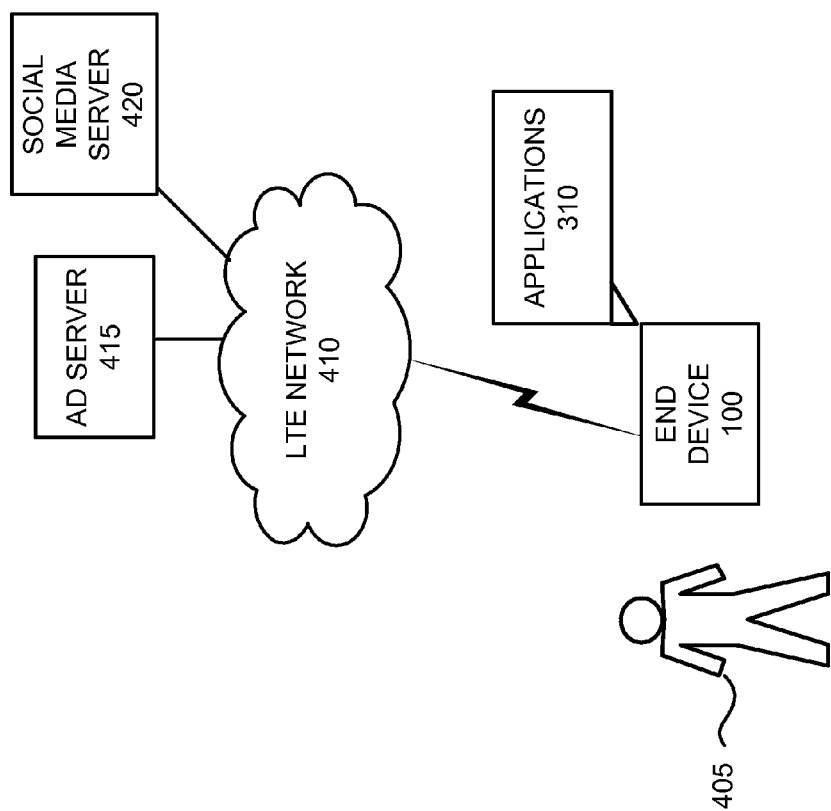
FIGS. 4A and 4B are diagrams illustrating exemplary scenarios pertaining to an exemplary traffic aggregation service provided by the traffic aggregator.

FIG. 4A is a diagram illustrating an exemplary scenario pertaining to the traffic aggregation service provided by traffic aggregator 305. Referring to FIG. 4A, assume a user 405 begins playing a free gaming application 310-1 (not illustrated) included in applications 310. Thereafter, an ad provider component of gaming application 310 generates a request to retrieve an ad from ad server 415. Traffic aggregator 305 receives the request data and determines that the request data originates from free gaming application 310-1. Traffic aggregator 305 also determines that communication interface 220 is in a dormant state. Traffic aggregator 305 determines to suspend the transmission of the request data according to a hold time. During this time, a social media application 310-2 (not illustrated) included in applications 310 is also running and generates a request to refresh or update content, which is to be transmitted to a social media server 410. Traffic aggregator 305 receives the refresh data and determines that the refresh data originates from social media application 310-2. Traffic aggregator 305 also determines that communication interface 220 is still in the dormant state. Traffic aggregator 305 determines to suspend the transmission of the refresh data according to a hold time.

Subsequently, the hold time pertaining to free gaming application 310-1 lapses. In response, traffic aggregator 305 releases both the request data and the refresh data. Thereafter, communication interface 220 enters an active state and transmits the request data and the refresh data in packets to ad server 415 and social media server 420. In this way, all currently held data is released and the timer may restart from that point in time.

Figure 4B:
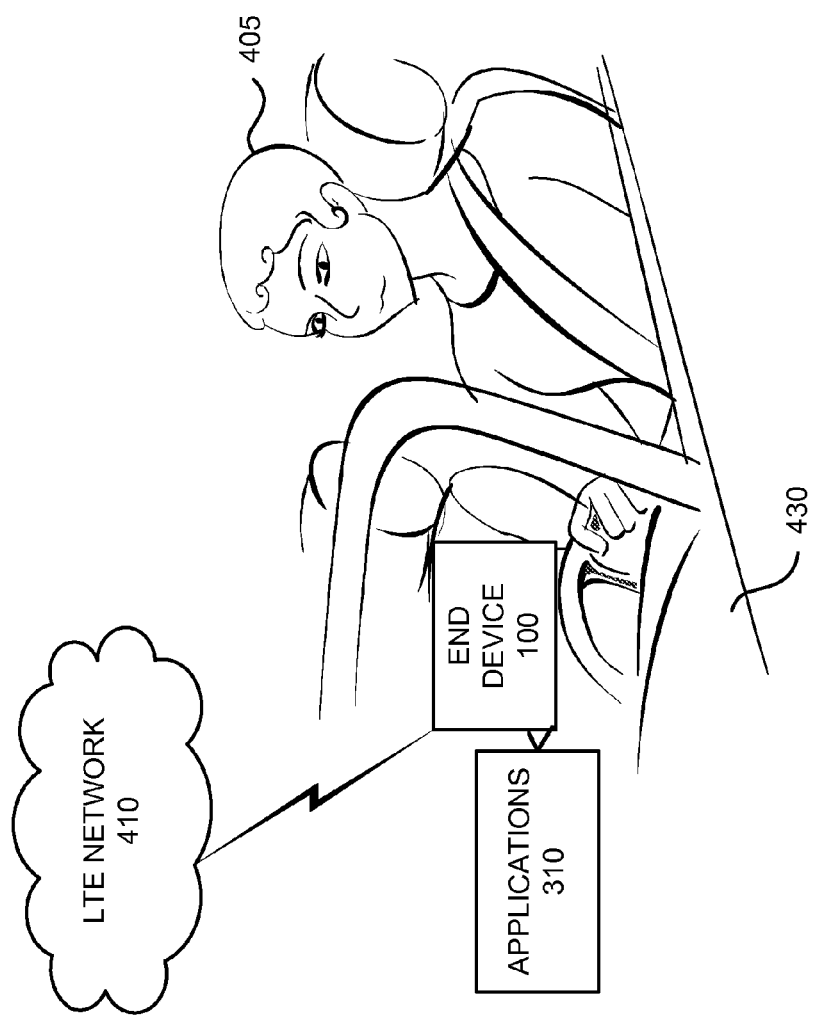

FIG. 4B is another diagram illustrating an exemplary scenario pertaining to the traffic aggregation service provided by traffic aggregator 305. Referring to FIG. 4B, assume user 405 is driving in a car 430 with end device 100 on the way to an appointment. During this time, one of applications 310 generates ping data. Traffic aggregator 305 receives the ping data and determines that the type of traffic pertaining to this data (i.e., ping data). Traffic aggregator 305 also determines that end device 100 is in a dormant state. Traffic aggregator 305 determines to suspend the transmission of the ping data according to a hold time. During the suspension period, end device 100 begins a handover process. According to an exemplary implementation, traffic aggregator 305 may be informed of the handover process based on incoming messages from and/or outgoing messages to LTE network 410. During the handover process, the hold time lapses. In response, traffic aggregator 305 increases the hold time until after the handover process is completed. Thereafter, traffic aggregator 305 releases the ping data to lower layers 315 and the ping data is transmitted.

Although exemplary processes of the traffic aggregation service have been described, in relation to distinct scenarios illustrated in FIGS. 4A and 4B, according to other scenarios, processes different from those described may be performed. Additionally, the exemplary processes described may include additional and/or different operations not specifically described in relation to FIGS. 4A and 4B. For example, traffic aggregator 305 may prioritize the order of transmission of packets belonging to different applications 310. Additionally, for example, traffic aggregator 305 may apply the longest hold time pertaining to one of the data sets, when data from multiple applications 310 is received, before releasing the data for transmission. This approach may be useful when traffic aggregator 305 predicts receipt of data from another application 310. In this way, traffic aggregator 305 may optimize traffic aggregation by minimizing the oscillation between dormant and active states of end device 100.

Figure 5A:
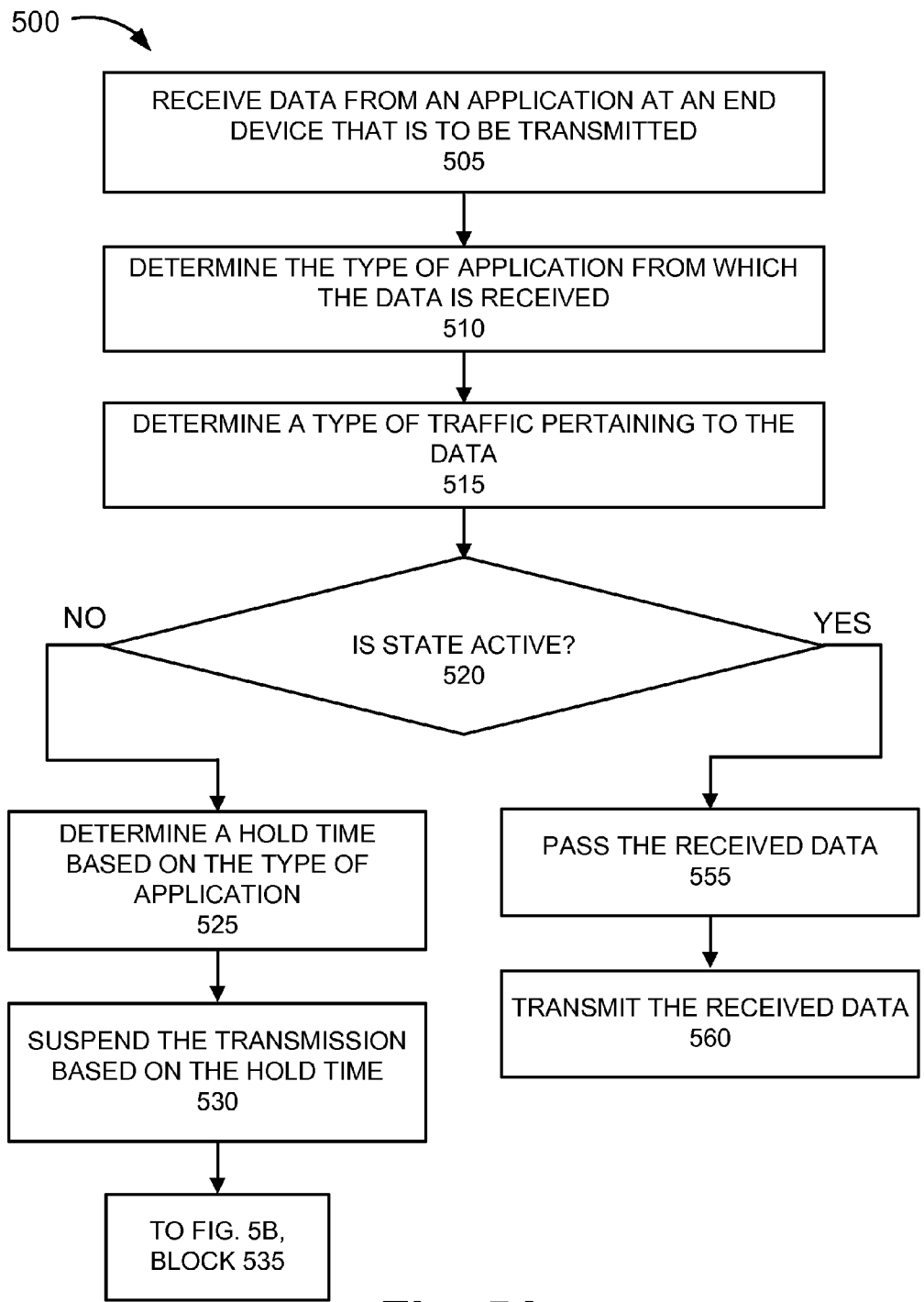
FIGS. 5A and 5B are flow diagrams that illustrate an exemplary process pertaining to an exemplary embodiment of the traffic aggregator.
Figure 5B:
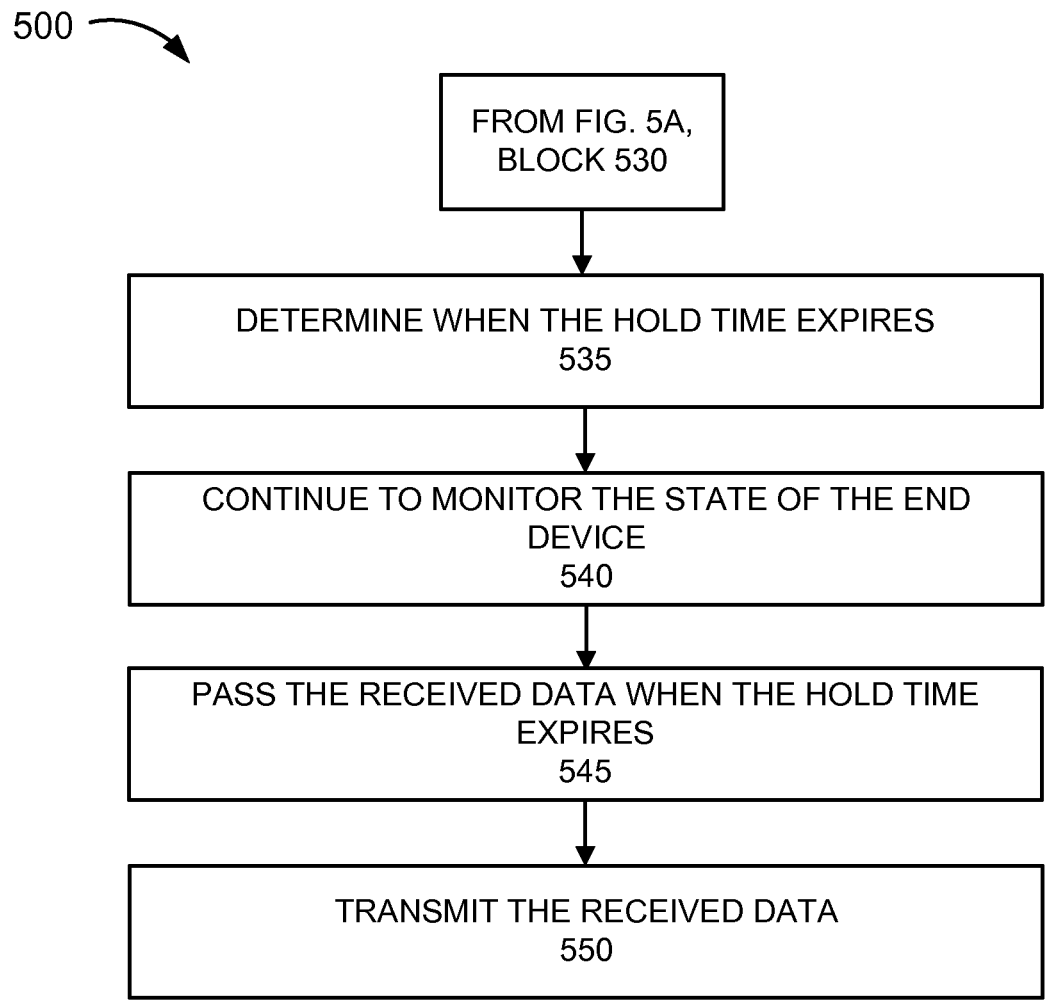

FIGS. 5A and 5B are flow diagrams that illustrate an exemplary process 500 pertaining to an exemplary embodiment of traffic aggregator 305. Process 500 is directed to a process previously described above with respect to FIGS. 3A and 3B, and elsewhere in this description. According to an exemplary embodiment, end device 100 performs one or more of the steps described in process 500. For example, processor 205 executes software 215 to perform a step described. By way of further example, processor 205 executes traffic aggregator 305, which is implemented as software 215.

Referring to FIG. 5A, process 500 begins, in block 505, by receiving data from an application, which is to be transmitted, at an end device. For example, traffic aggregator 305 receives data from application 310.

In block 510, the type of application from which the data is received is determined. For example, traffic aggregator 305 inspects the received data to determine the type of application from which the data is received. In block 515, a type of traffic is determined. For example, traffic aggregator 305 determines the type of traffic pertaining to the data.

In block 520, it is determined whether the end device is in active state. For example, traffic aggregator 305 determines if end device 100 is in an active state or a dormant state.

If it is determined that the state of the end device is not in active state (block 520-NO), then a hold time is determined based on the type of application (block 525). For example, traffic aggregator 305 uses aggregation table 350 to select a hold time. In block 530, the transmission of the received data is suspended. For example, traffic aggregator 305 suspends the passing of the data to lower layers 315 according to the hold time.

Referring to FIG. 5B, in block 535, it is determined when the hold time expires. For example, traffic aggregator 305 determines when the hold time expires. In block 540, the state of the end device is monitored. For example, traffic aggregator 305 continues to monitor the state of end device 100. For example, end device 100 may enter an active state at any time. Additionally, during the hold time period, traffic aggregator 305 may receive additional data (e.g., block 505). Additionally, traffic aggregator 305 may have other data held according to a hold time. However, for the sake of simplicity, these other scenarios have been omitted for this example.

In block 545, the received data is passed when the hold time expires. For example, traffic aggregator 305 determines that the hold time has expired. In response, traffic aggregator 305 passes the received data to lower layers 315. The received data may be encapsulated into one or more packets by lower layers 315.

In block 550, the received data is transmitted. For example, end device 100 transmits the data in packets, via communication interface 220, to a network device.

Referring back to FIG. 5A, if it is determined that the state of the end device is active (block 520-YES), then the received data is passed (block 555) and the received data is transmitted (block 560), in a manner previously described in blocks 545 and 550.

Although FIGS. 5A and 5B illustrate an exemplary traffic aggregation service process 500, according to other embodiments, process 500 may include additional operations, fewer operations, and/or different operations than those illustrated in FIGS. 5A and 5B and described herein.

As previously described in relation to FIGS. 3A and 3B, as well as elsewhere in this description, traffic aggregator 305 performs traffic aggregation based on the type of application 310 from which the data is received, the state of end device 100, and a hold time. According to an exemplary embodiment, a network device provides policies to end device 100 so that traffic aggregator 305 performs traffic aggregation accordingly. A further description is provided below.

Figure 6:
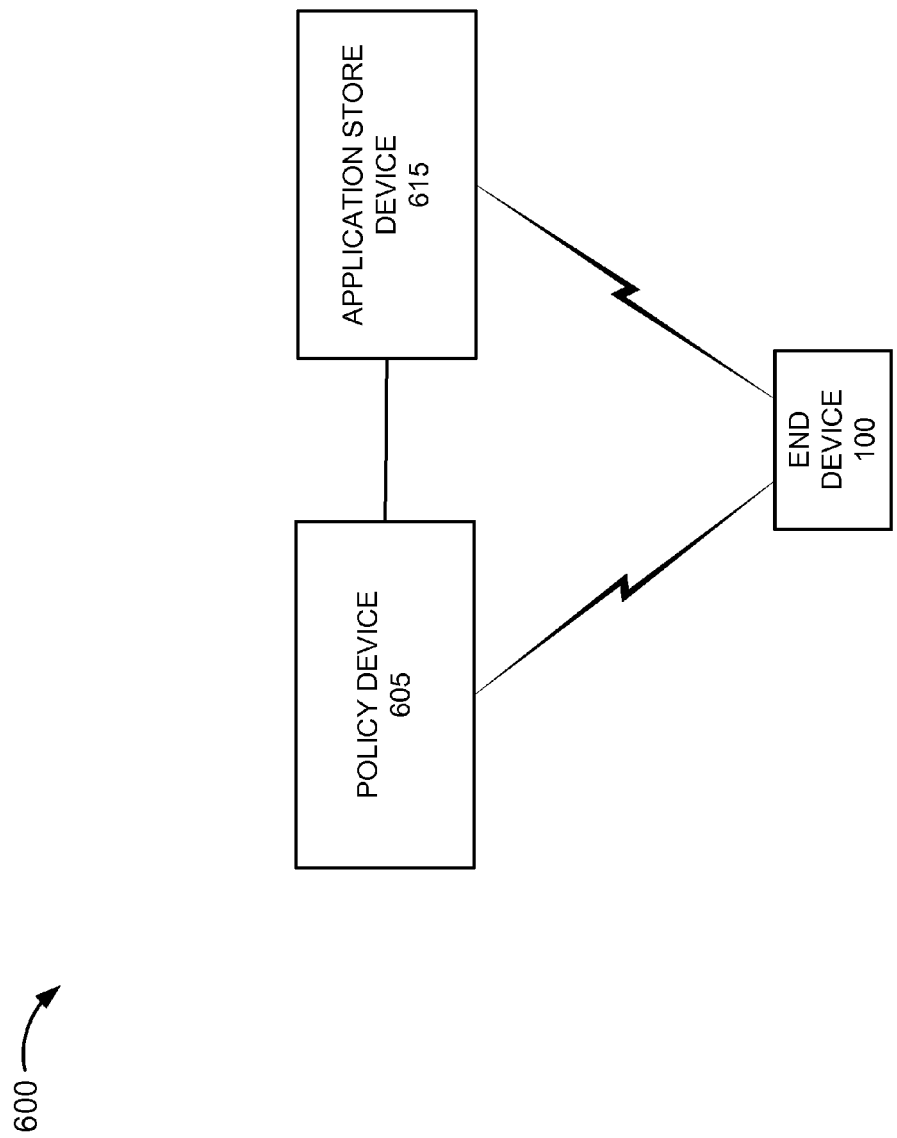
FIG. 6 is a diagram illustrating an exemplary environment in which an exemplary embodiment pertaining to a certification service may be implemented.

FIG. 6 is a diagram illustrating an exemplary environment 600 in which an exemplary embodiment pertaining to a certification service may be implemented. As illustrated, environment 600 includes a policy device 605, an application store device 615, and end device 100. Environment 600 may be implemented to include wired, optical, and/or wireless connections among the devices illustrated. A connection may be direct or indirect and may involve an intermediary device and/or a network not illustrated in FIG. 6. Additionally, the number, type (e.g., wired and wireless), and the arrangement of connections between the devices are exemplary.

A device may be implemented according to a centralized computing architecture, a distributed computing architecture, or a cloud computing architecture (e.g., an elastic cloud, a private cloud, a public cloud, etc.). Additionally, a device may be implemented according to one or multiple network architectures (e.g., a client device, a server device, a peer device, a proxy device, and/or a cloud device).

The number of devices and the configuration in environment 600 are exemplary. According to other embodiments, environment 600 may include additional devices, fewer devices, and/or differently arranged devices, than those illustrated in FIG. 6. For example, a single device in FIG. 6 may be implemented as multiple devices and/or multiple devices may be implemented as a single device. By way of further example, policy device 605 may be implemented as multiple devices, such as a computer and an external storage device that stores network policies, or policy device 605 and application store device 615 may be combined into a single device.

Policy device 605 includes a network device that determines a category of an application. For example, policy device 605 assigns a group identifier to an application that indicates a type of the application and/or a hold time for the application. According to an exemplary implementation, an application declares its function (e.g., a real-time communication application, etc.) and policy device 605 assigns the application a group identifier corresponding to such a function. Application store device 615 includes a network device that stores applications for users to download. According to an exemplary embodiment, application store device 615 can assign a group identifier to an application. According to another exemplary embodiment, application store device 615 cannot assign a group identifier to an application.

Applications 310 of end device 100 may be pre-installed or downloaded by the user of end device 100. There are various ways in which applications 310 may be assigned a group identifier, examples of which are described. However, the examples described are not intended to be exhaustive but merely illustrative.

According to an exemplary implementation, assume application store device 615 receives an application to offer to users for download. Application store device 615 performs a certification process that includes assigning a group identifier to the application. For example, application store device 615 determines the type of application (e.g., web browsing, real-time, etc.). For example, the application may declare its function. Application store device 615 uses network policies to select and the appropriate policy for the determined type of application and a group identifier. Based on this certification process, when a user downloads the application to end device 100, traffic aggregator 305 stores the policy and the group identifier pertaining to the application. The policy includes the hold time and may include other parameters, as previously mentioned above.

According to another exemplary implementation, when application store device 615 receives an application, application store device 615 uses policy device 605 to assign the policy and the group identifier to the application. For example, application store device 615 may transmit information pertaining to the application (e.g., name of application, version, name of developer, etc.) and/or the application to policy device 605. Policy device 605 selects the policy suitable for the application and the group identifier. The policy information and the group identifier is provided to application store device 615. Similar to that previously described, when a user downloads the application to end device 100, traffic aggregator 305 stores the policy and the group identifier pertaining to the application.

According to yet another exemplary implementation, the user may download the application from application store device 615. When the user installs the application, the application or an agent residing on end device 100 invokes the certification process with policy device 605. As a result of the certification process, traffic aggregator 305 stores the policy and the group identifier pertaining to the application. According to still another exemplary implementation, applications 310 that are pre-installed on end device 100, the policy information and the group identifier may already be stored on end device 100. Alternatively, applications 310 may, when first executed, include a setup process that includes the certification process with respect to policy device 605.

Figure 7:
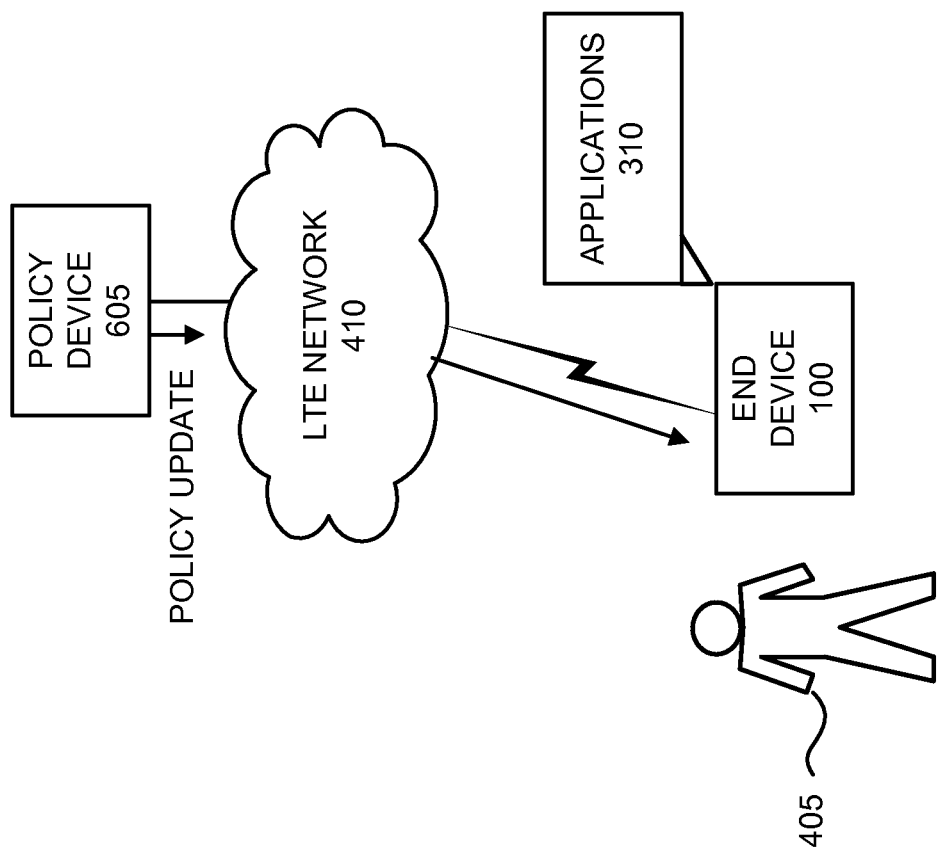
FIG. 7 is a diagram illustrating an exemplary scenario in which traffic aggregation policies are obtained by the end device.

According to an exemplary embodiment, the policies for applications 310 may not be static. Referring to FIG. 7, policy device 605 may provide and/or configure policies on end device 100. For example, according to an exemplary implementation, policy device 605 transmits an update to a policy when end device 100 attaches to LTE network 410 and/or during some other suitable time or in response to some other triggering event. According to other implementations, policy device 605 may transmit a policy, which does not necessarily constitute an update, to end device 100. Traffic aggregator 305 stores the policy and uses the policy when performing traffic aggregation, as described herein.

Referring back to FIG. 3A, according to an exemplary embodiment, when traffic aggregator 305 receives data from application 310, traffic aggregator 305 determines the group identifier for that application. As an example, traffic aggregator 305 may inspect the data to determine the group identifier, application 310 may provide its group identifier when invoked to traffic aggregator 305, or some other means may be used. According to such an embodiment, referring to FIG. 3B, in addition to or instead of application group field 355, aggregation table 350 includes a group identifier field that indicates a group identifier for the application that correlates to hold time field 360. Additionally, other fields may be added to aggregation table 350 that pertain to other parameters of the policy (e.g., prediction, handover, type of traffic, etc.). In this way, the policies of traffic aggregation may be deployed and managed from the network side. Thus, when traffic aggregator 305 determines the group identifier, traffic aggregator 305 may apply the appropriate traffic aggregation policies corresponding to the group identifier.

The foregoing description of embodiments provides illustration, but is not intended to be exhaustive or to limit the embodiments to the precise form disclosed. Accordingly, modifications to the embodiments described herein may be possible.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while series of blocks have been described with regard to the processes illustrated in FIGS. 5A and 5B, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software and/or firmware executed by hardware. For example, a process or a function may be implemented as "logic" or as a "component." The logic or the component may include, for example, hardware (e.g., processor 205, etc.), or a combination of hardware and software (e.g., software 215). The embodiments have been described without reference to the specific software code since the software code can be designed to implement the embodiments based on the description herein and commercially available software design environments/languages.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded as illustrative rather than restrictive.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

Additionally, embodiments described herein may be implemented as a non-transitory storage medium that stores data and/or information, such as instructions, program code, data structures, program modules, an application, etc. The program code, instructions, application, etc., is readable and executable by a processor (e.g., processor 205) of a computational device. A non-transitory storage medium includes one or more of the storage mediums described in relation to memory/storage 210.

No element, act, or instruction described in the present application should be construed as critical or essential to the embodiments described herein unless explicitly described as such.

What is claimed is:

1. A method comprising:
   receiving, by an end device and from a network device, traffic aggregation settings that include group identifiers and hold time values for applications;
   storing, by the end device, the traffic aggregation settings pertaining to a traffic aggregation service, wherein each of the hold time values indicates a maximum period of time to suspend a transmission of data from the end device;
   receiving, by the end device, data from an application resident on the end device;
   determining, by the end device, a type of application from which the data is received, wherein the determining comprises:
      selecting, by the end device, one of the group identifiers based on the data received from the application;
   determining, by the end device, whether the end device is in an active state;
   selecting, by the end device, one of the hold time values in response to determining that the end device is not in the active state;
   suspending, by the end device, a transmission of the data in response to the selecting, wherein the transmission of the data is suspended for at least a portion of a maximum time period indicated by the one of the hold time values;
   releasing, by the end device, the suspension of the data;
   instructing, by the end device, a first layer of a network communicative stack, via a second layer of the network communicative stack that suspends the transmission of the data, to operate on the data, wherein the second layer is a layer higher in the network communicative stack than the first layer; and
   transmitting, by the end device, the data subsequent to the at least the portion of the maximum time period elapsed.

2. The method of claim 1, further comprising:
   determining, by the end device, a type of traffic pertaining to the data; and
   selecting, by the end device, the one of the hold time values based on the type of traffic.

3. The method of claim 2, wherein the type of traffic is traffic requesting an advertisement from an ad server device residing in a network.

4. The method of claim 1, wherein the hold time values are dynamic, and the method further comprising:
   encapsulating, by the end device, the data into one or more packets.

5. The method of claim 1, wherein determining whether the end device is in the active state further comprises:
   determining, by the end device, whether a communication interface of the end device is in the active state.

6. The method of claim 1, further comprising:
   storing, by the end device, historical data that indicates behaviors of applications resident on the end device, wherein the behaviors pertain to outbound communications;
   predicting, by the end device, an arrival of other data from another application resident on the end device based on the historical data; and
   extending, by the end device, the maximum time period indicated by the one of the hold time values based on the prediction of the arrival of the other data.

7. The method of claim 1, further comprising:
   detecting, by the end device, a handover process between the end device and a network; and
   extending, by the end device, the maximum time period indicated by the one of the hold time values based on the detection of the handover process.

8. An end device comprising:
   a communication interface;
   a memory, wherein the memory stores instructions; and
   a processor, wherein the processor executes the instructions to:
      receive, via the communication interface and from a network device, traffic aggregation settings, wherein the traffic aggregation settings include group identifiers and hold time values for applications;
      store the traffic aggregation settings pertaining to a traffic aggregation service, wherein each of the hold time values indicates a maximum period of time to suspend a transmission of data from the end device;
      receive data from an application resident on the end device;
      determine a type of application from which the data is received, wherein when determining the type of application, the processor further executes the instructions to:
         select one of the group identifiers based on the data received from the application;
      determine whether the end device is in an active state;
      select one of the hold time values in response to a determination that the end device is not in the active state;
      suspend a transmission of the data in response to the selection of the one of the hold time values, wherein the transmission of the data is suspended for at least a portion of a maximum time period indicated by the one of the hold time values;
      release the suspension of the data;
      instruct a first layer of a network communicative stack, via a second layer of the network communicative stack that suspends the transmission of the data, to operate on the data, wherein the second layer is a layer higher in the network communicative stack than the first layer; and transmit, via the communication interface, the data subsequent to the at least the portion of the maximum time period elapsed.

9. The end device of claim 8, wherein the processor further executes the instructions to:

determine a type of traffic pertaining to the data; and select the one of the hold time values based on the type of traffic, wherein the state of the end device includes a state of the communication interface, and wherein the end device is a mobile device.

10. The end device of claim 9, wherein the type of traffic is one of traffic requesting an advertisement or heartbeat traffic.

11. The end device of claim 8, wherein the processor further executes the instructions to:

predict an arrival of other data from another application resident on the end device based on historical data; and extend the maximum time period indicated by the one of the hold time values based on the prediction of the arrival of the other data.

12. The end device of claim 8, wherein the hold time values are dynamic, wherein the processor further executes the instructions to:

collect historical data pertaining to behaviors of applications resident on the end device, wherein the behaviors pertain to characteristics of outbound communications;

store the historical data;

analyze the historical data;

calculate one or more hold time values for one or more of the applications; and store the one or more hold time values, wherein the hold time values include the one or more hold time values.

13. The end device of claim 8, wherein the processor further executes the instructions to:

detect a handover process between the end device and a network; and extend the maximum time period indicated by the one of the hold time values based on the detection of the handover process.

14. The end device of claim 8, wherein the processor further executes the instructions to:

provide a user interface that allows a user to configure the traffic aggregation settings.

15. The end device of claim 8, wherein the processor further executes the instructions to:

prevent the communication interface from entering a dormant state when data is predicted to be received by an application within a certain time window and a probability value pertaining to a prediction meets a certain threshold value.

16. A non-transitory, computer-readable storage medium storing instructions executable by a processor of a computational device, which when executed cause the computational device to:

receive traffic aggregation settings from a network device, wherein the traffic aggregation settings include group identifiers and hold time values for applications;

store the traffic aggregation settings pertaining to a traffic aggregation service, wherein each of the hold time values indicates a maximum period of time to suspend a transmission of data from the computational device;

receive data from an application resident on the computational device;

determine a type of application from which the data is received, wherein the determining further comprises to select one of the group identifiers based on the data received from the application;

determine whether the computational device is in an active state;

select one of the hold time values in response to a determination that the computational device is not in the active state;

suspend a transmission of the data in response to the selection of the one of the hold time values, wherein the transmission of the data is suspended for at least a portion of a maximum time period indicated by the one of the hold time values;

release the suspension of the data;

instruct a first layer of a network communicative stack, via a second layer of the network communicative stack that suspends the transmission of the data, to operate on the data, wherein the second layer is a layer higher in the network communicative stack than the first layer; and transmit the data subsequent to the at least the portion of the maximum time period elapsed.

17. The non-transitory, computer-readable storage medium of claim 16, further storing instructions executable by the processor of the computational device, which when executed cause the computational device to:

determine a type of traffic pertaining to the data; and select the one of the hold time values based on the type of traffic, wherein the state of the computational device includes a state of a communication interface of the computational device.

18. The non-transitory, computer-readable storage medium of claim 16, wherein the hold time values are user-configurable.

19. The non-transitory, computer-readable storage medium of claim 16, further storing instructions executable by the processor of the computational device, which when executed cause the computational device to:

suspend a transmission of other data during the maximum time period, wherein the other data pertains to another application resident on the computational device; and aggregate the data and the other data before a transmission of the data and the other data.

20. The non-transitory, computer-readable storage medium of claim 16, further storing instructions executable by the processor of the computational device, which when executed cause the computational device to:

prevent the computational device from entering a dormant state when data is predicted to be received by an application within a certain time window and a probability value pertaining to a prediction meets a certain threshold value.

21. A method comprising:

storing, by an end device, traffic aggregation settings pertaining to a traffic aggregation service, wherein the traffic aggregation settings include hold time values that each indicate a maximum period of time to suspend a transmission of data from the end device;

receiving, by the end device, data from an application resident on the end device;

determining, by the end device, a type of application from which the data is received;

determining, by the end device, whether the end device is in an active state;

selecting, by the end device, one of the hold time values in response to determining that the end device is not in the active state;

suspending, by the end device, a transmission of the data in response to the selecting, wherein the transmission of the data is suspended for at least a portion of a maximum time period indicated by the one of the hold time values;

transmitting, by the end device, the data subsequent to the at least the portion of the maximum time period elapsing receiving, by the end device, other data from another application resident on the end device;

determining, by the end device, a type of application from which the other data is received;

determining, by the end device, whether the end device is in the active state;

selecting, by the end device, another one of the hold time values in response to determining that the end device is not in the active state;

suspending, by the end device, a transmission of the other data in response to the selecting the other one of the hold time values, wherein both the data and the other data are suspended, and wherein a maximum time period indicated by the other one of the hold time values is different than the maximum time period indicated by the one of the hold time values;

aggregating, by the end device, the data and the other data; and transmitting, by the end device, the data and the other data subsequent to the at least the portion of the maximum time period elapsed.

* * * * *